L. H. FREEMAN.
IRONING MACHINE.
APPLICATION FILED JULY 5, 1912.
1,329,519.
Patented Feb. 3, 1920.
5 SHEETS—SHEET 1.
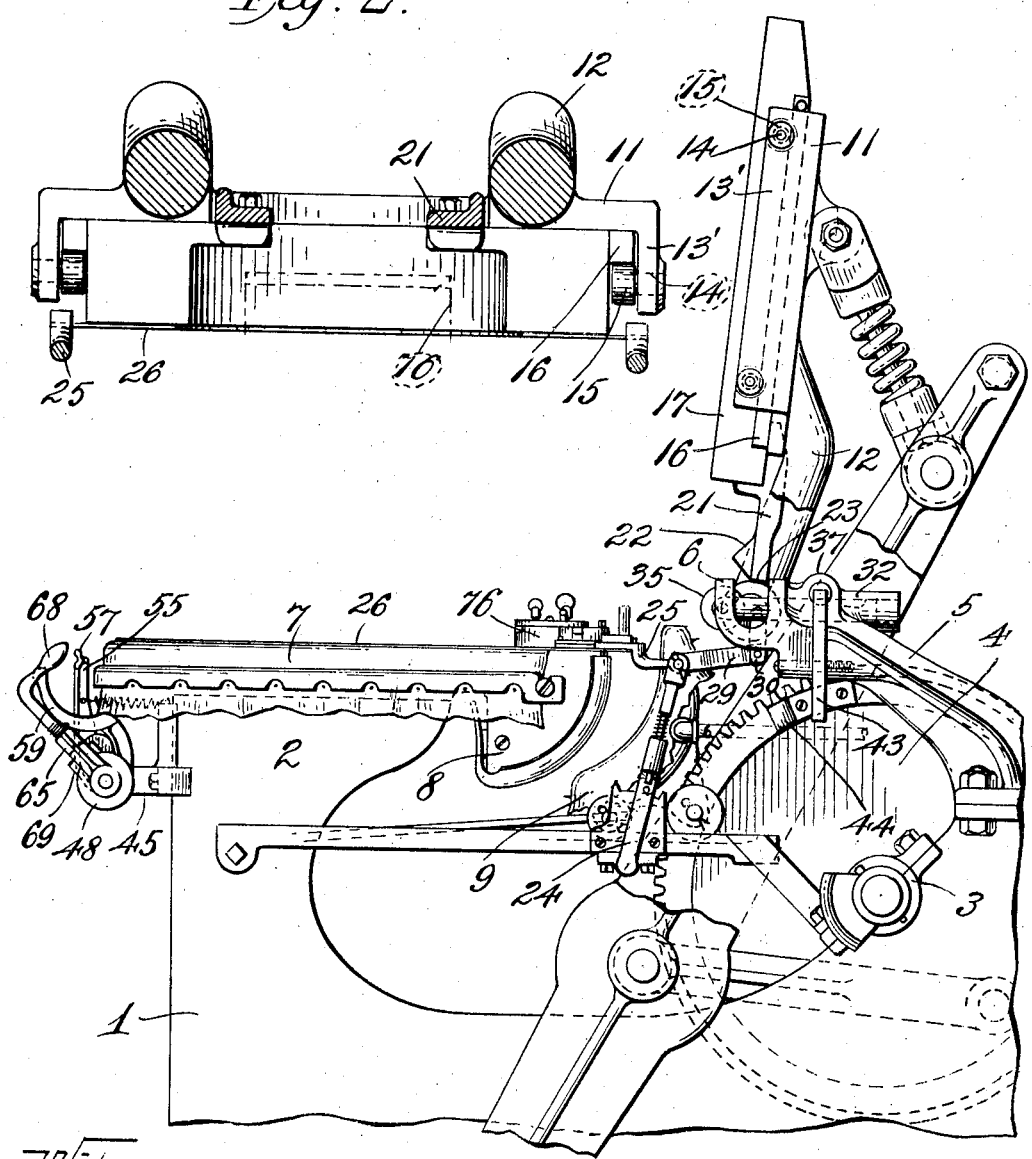

L. H. FREEMAN.
IRONING MACHINE.
APPLICATION FILED JULY 5, 1912.
1,329,519. Patented Feb. 3, 1920.
5 SHEETS—SHEET 2.
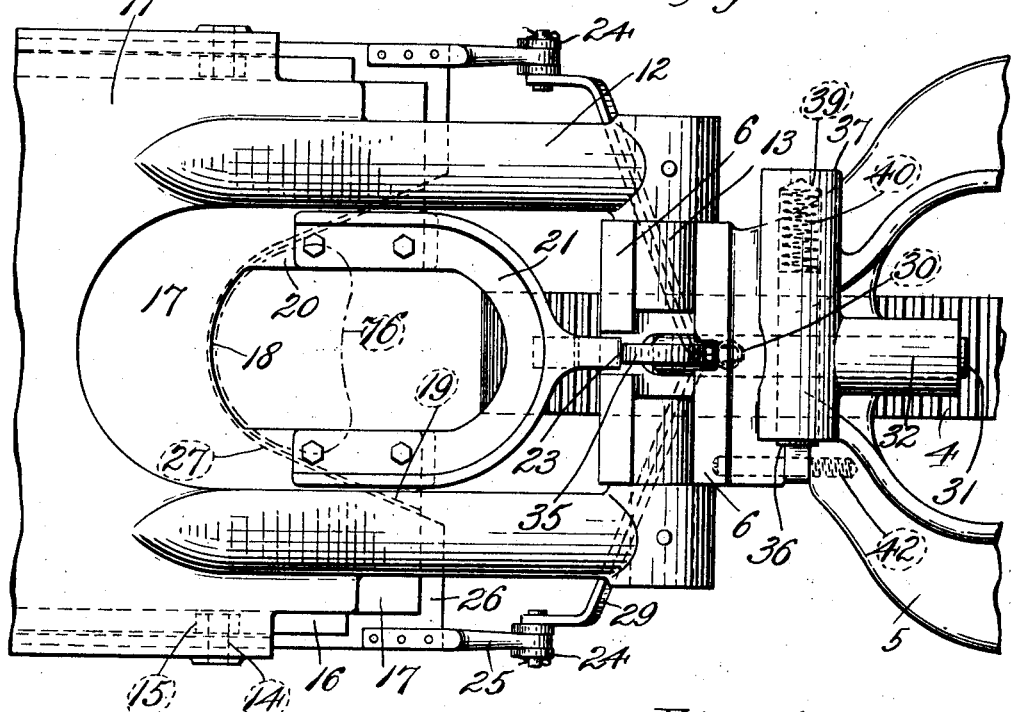
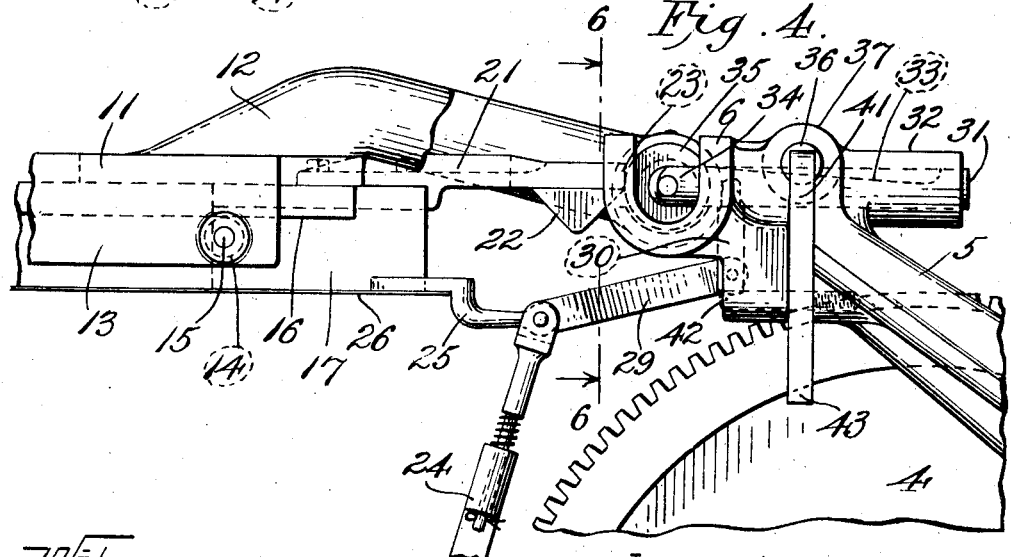
Witnesses:
A. L. Lord.
C. N. Fresch.
Inventor.
Ladbrook H. Freeman
by B. W. Brockett.
Atty.

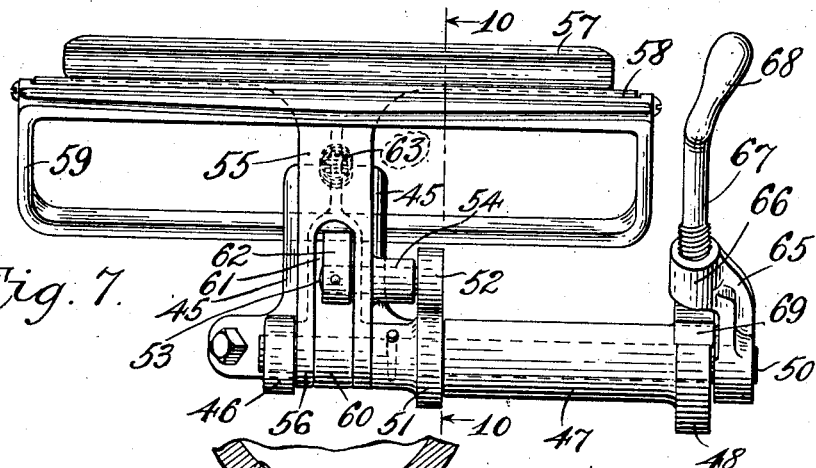
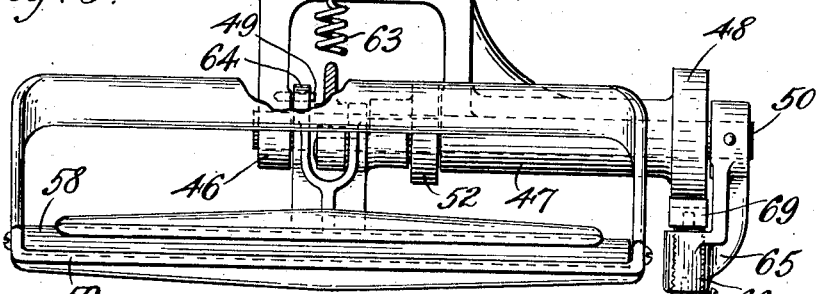
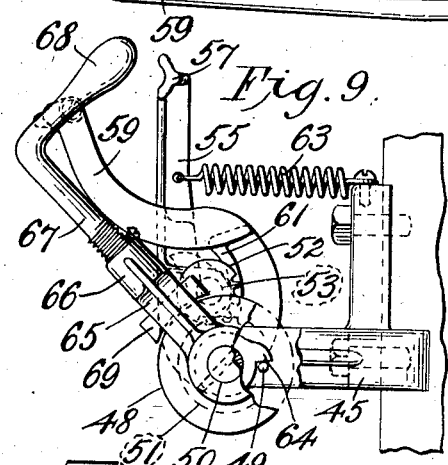

L. H. FREEMAN.
IRONING MACHINE.
APPLICATION FILED JULY 5, 1912.
1,329,519.
Patented Feb. 3, 1920.
5 SHEETS—SHEET 5.
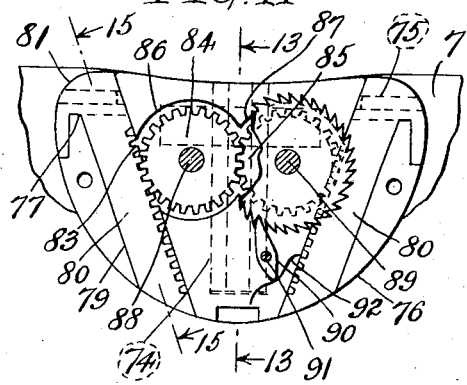
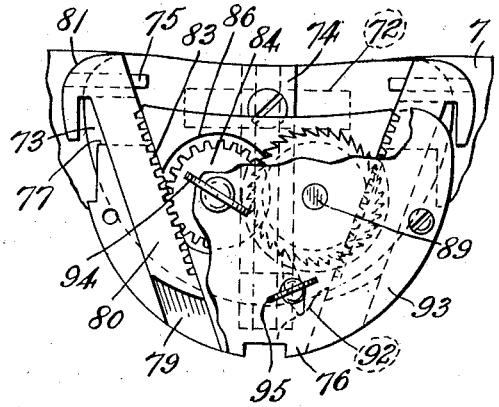
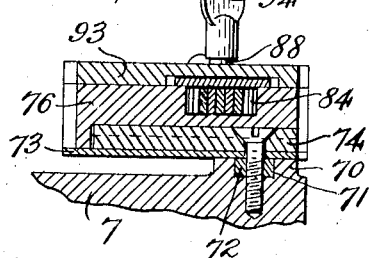
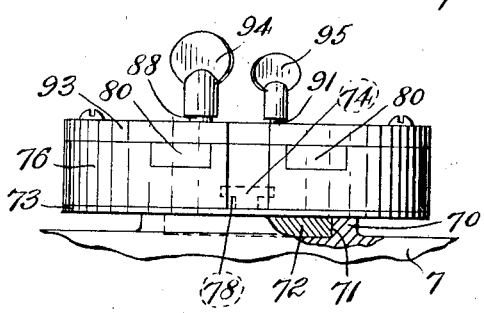
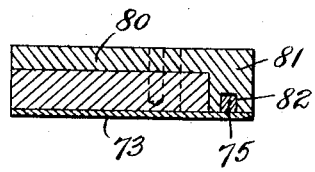
Witnesses:
A. L. Lord.
D. Tozer.
Inventor.
Ladbrook H. Freeman
by B. W. Brockett
Atty.

UNITED STATES PATENT OFFICE.

LADBROOK H. FREEMAN, OF CLEVELAND, OHIO, ASSIGNOR, BY MESNE ASSIGNMENTS, TO THE FIRST TRUST & SAVINGS COMPANY, OF CLEVELAND, OHIO, A CORPORATION OF OHIO, TRUSTEE.

IRONING-MACHINE.

1,329,519.      Specification of Letters Patent.      Patented Feb. 3, 1920.

Application filed July 5, 1912. Serial No. 707,886.

*To all whom it may concern:*

Be it known that I, LADBROOK H. FREEMAN, a citizen of the United States, residing at Cleveland, in the county of Cuyahoga and State of Ohio, have invented certain new and useful Improvements in Ironing-Machines, of which the following is a specification.

This invention relates to improvements in ironing machinery and particularly to that class of devices utilized in ironing shirts and waists.

More specifically the invention relates to mechanism for adjusting the position of the movable ironing chest or member to the ironing board and neck band former, the operation being performed automatically by the location of the ironing plate upon the work.

The invention may be further briefly summarized as consisting in the construction and combination of parts hereinafter set forth in the following description, drawings and claims.

Figure 5:
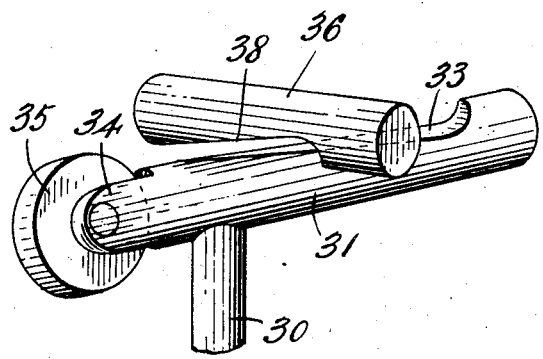
Figure 6:
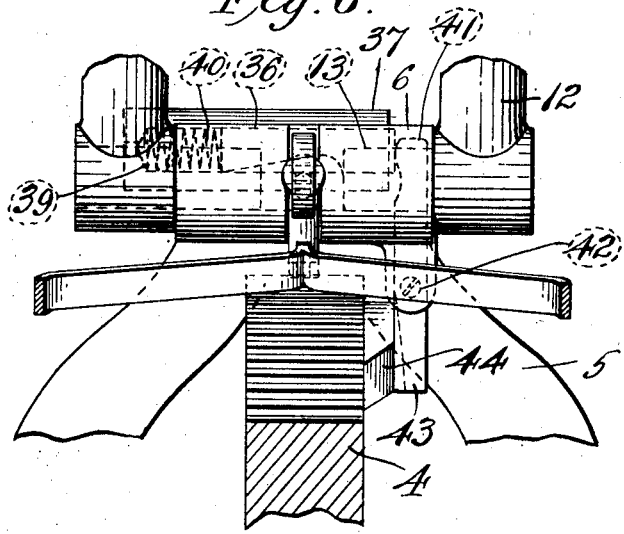

Referring to the drawings, Figure 1 is a side elevation of the machine provided with my device; Fig. 2 is a sectional view through the supports of the movable ironing chest; Fig. 3 is a top plan view of a portion of the mechanism; Fig. 4 is a side elevation of the same portion of the mechanism; Fig. 5 is a detail perspective view of the wedges which control the movement of the movable ironing chest; Fig. 6 is a section upon the line 6—6 of Fig. 4 looking to the right with the chest raised; Fig. 7 is a front elevation of the bosom stretcher; Fig. 8 is a top plan view of the same; Fig. 9 is an end view with parts broken away; Fig. 10 is a section upon the line 10—10 of Fig. 7 looking to the left; Fig. 11 is a top plan view of a neck band former shown on a portion of a chest with the top plate removed and with parts broken away; Fig. 12 is a similar view with the forward portion of the neck band former extended, and with the top plate broken away at several points; Fig. 13 is a sectional view on the line 13—13 of Fig. 11 looking in the direction of the arrows; Fig. 14 is a front elevation; and Fig. 15 is a section upon the line 15—15 of Fig. 11 looking in the direction of the arrows.

In carrying out the invention any preferred form and construction of parts may be employed so long as they possess the necessary characteristics, but I have shown one form and construction in the drawings which is highly effective in operation, and in such embodiment 1 represents the frame which is provided with an ironing board support, 2, and suitable bearings 3 of a main driving gear 4, and also with suitable brackets 5 provided with sockets 6 which receive trunnions of a movable ironing chest to be later described.

Secured to the ironing board support 2 is the ironing board 7 provided with the usual yoke ironing board portion 8 with which a suitable yoke ironer 9 coöperates. Mounted on the ironing board near the yoke end is a neck band former of any preferred construction but having its forward curved portion movable for the various sizes of neck bands as will later appear. Coöperating with this ironing board is ironing chest mechanism comprising a supporting member 11 provided with rearwardly extending brackets 12 provided with trunnions 13 mounted in the socket 6. This supporting member 11 is provided at its side edges with downwardly extending flanges 13' provided near each end with pins 14 carrying rollers 15, shown in dotted lines in Fig. 3, and engaging under flanges 16 carried by the ironing chest 17 which is slidably mounted within the ironing chest supporting member 11. It will be seen from the foregoing construction that the ironing chest 17 may slide freely in a longitudinal direction in its support and upon the rollers 15. The ironing chest is provided near its back end with a curved recess shown at 18 to receive the neck band former, shown in dotted lines in Fig. 3, and this curved portion extends out to the end of the chest with straight side portions 19, as shown in dotted lines in Fig. 3. Above the neck band former, however, the ironing chest is provided with flat portions 20 having secured to them a yoke 21 provided with a cam 22 and a square end portion 23. This latter portion being shown in dotted lines in Fig. 4.

In order to position the ironing chest with respect to the ironing board and the neck band former, it is necessary that the curved edge of the recess 18 be properly located, so that when the ironing chest comes down upon the work the edge of the chest will miss the forward edge of the neck band former and yet will be near to this edge so that heat will be conveyed to the bosom near the neck band. This mechanism is under the control of the ironing plate and the construction will now be described.

Pivotally secured to a stationary part of the machine and on both sides there are two arms 24. These arms are pivoted at the upper ends to brackets 25 rigidly secured to an ironing plate 26 which is of the usual construction and is provided with a recess 27 for receiving the neck band former. The recess is shown in dotted lines in Fig. 3. Pivotally secured to the upper ends of the arms 24 is another yoke 29 pivoted to a pin 30 rigidly secured at its upper end in the bottom of a sliding bar 31 mounted in a suitable bearing support 32 preferably cast so as to form a part of the supporting brackets 5. The upper face of this sliding bar 31 is cut away at 33 so as to form a wedge of the bar. The forward end of this bar is bifurcated to form ears 34 to receive between them a friction roller 35. The sliding bar 31 and the roller 35 are supported in a manner such that the roller lies in the path of the cam 22. It will be seen from the foregoing construction that as the ironing plate 26 is manipulated upon the bosom of the shirt and the front edge of the recess is brought against the front face of the neck band, the roller 35 will be properly positioned to cause the ironing chest to be cammed out so that the edge of its neck band recess will pass the forward edge of the neck band former and will come to a state of rest upon the ironing board in the proper relationship with respect to the neck band former.

In order to hold the sliding bar and its friction roller 35 in any adjusted position a suitable lock is provided, and it comprises a sliding wedge 36 mounted in a bearing 37 arranged transversely with respect to the bearing 32. This wedge has a flat face 38 coöperating with the face 33. The bearing 37 has a shoulder 39, shown in dotted lines in Fig. 3, to receive the thrust of a spring 40, shown in dotted lines in Fig. 3, and bearing against the wedge 36, the tendency being for the wedge to engage the sliding bar 31 and slip in above it and hold it in any position in which it is adjusted so that from the description of the sliding bar 31 and its action with respect to the ironing chest it will be seen that when the ironing plate adjusts the sliding bar and the friction roller 35, the wedge 36 slides in above the bar 31 and holds it in any adjusted position.

It is essential that the sliding bar 31 should be released upon the final upward movement of the ironing chest, and this is brought about by means of a lever 41 mounted upon a pin 42 secured in one of the brackets 5, as shown in Figs. 3 and 4 as well as in Fig. 6. This lever has a tail portion 43 extending down to a point where it may engage a cam 44 mounted upon the side face and near the periphery of the main driving gear 4, the cam being so positioned upon the gear that when the ironing chest is up the cam engages the tail portion of the lever and shifts it so as to push the wedge 36 back in its bearing against the tension of the spring 40 so that the sliding bar 31 may be moved freely by the ironing plate 26.

It will be seen from the foregoing description that when a shirt is placed upon the bosom board and the neck band former is adjusted to fill the neck band and the operator moves the ironing plate down upon the article with the neck band recess in the ironing plate in engagement with the forward curved portion of the neck band, the parts already described will adjust the final position of the ironing chest in such a manner that the curved edge of the ironing chest at the neck band recess will move down to the proper position and engage the bosom close to the neck band at all times and irrespective of the size of the neck band.

Mechanism is also provided for stretching the bosom over the ironing board, and it comprises a bracket 45 secured to the front face of the ironing board support 2 as shown in Fig. 1. This bracket 45 has outwardly extending bearing portions 46 and 47, the portion 47 being long enough to extend to a point at one side of the ironing board and there provided with a friction disk 48, for a purpose to be described. The inner face of the bearing 46 is provided with a pin 49 for a purpose to be described. Rotatably mounted in these bearings 46 and 47 is a shaft 50 having keyed to it between the two bearings a mutilated gear 51 which meshes with another mutilated gear 52 mounted upon a shaft 53 pivoted in a bearing 54 forming a part of a stretcher bracket 55 provided with a bifurcated bearing portion 56 loosely mounted upon the shaft 50. The stretching bracket is provided with a recessed stretcher portion 57 arranged transversely with respect to the ironing board and extending across the front, as shown in Fig. 1. Coöperating with this member is a clamping roller 58 covered with rubber and mounted in a frame 59 which extends about the bracket 55 and to the rear thereof and is swiveled by means of a suitable bearing 60 upon the shaft 50. This frame 59 is provided with a cam portion 61 adapted to coöperate with a cam 62 secured on the end of the shaft 53. A spring 63 is arranged between the bracket 55 and the stationary bracket 45 and normally tends to draw the bracket 55 inward toward the end of the ironing board and this inward movement is limited by a shoulder 64 forming a part of the bracket and engaging the pin 49. This shoulder is shown in top plan in Fig. 8 and is shown in side elevation in Fig. 9. The shaft 50 is manipulated by a suitable lever 65 keyed to the shaft and having a boss 66 provided with a threaded opening in radial alinement with the periphery of the disk 48. Threaded in the opening of the boss 66 is a rod 67 provided with a hand grip 68 at its upper and with a shoe 69 at its lower end for engagement upon the periphery of the friction disk 48.

The arrangement of this part of the mechanism is such that when the shirt is being placed upon the machine the forward skirt portion is drawn down over the transverse member 57, when the parts are in the position shown in Fig. 9. The operator then rotates the rod 67 to release the shoe 69 from engagement with the friction disk and pulls forward upon this rod with the result that the lever 65 is rocked in a counter clockwise direction, as shown in Figs. 1, 9 and 10, causing the shaft 50 to be rotated, and likewise the gear 51. The rotation of the gear 51, however, rotates the gear 52 in a clockwise direction, causing the cam 62 to engage the cam portion 61 of the frame 59, causing the roller 58 to be brought up snugly against the transverse stretching member 57 of the bracket 55. When this clamping operation has taken place, the further forward movement of the rod 67 of the lever 65 causes the frame 59 as well as the bracket 55 to be moved forward or to be rocked in a counter-clockwise direction, as shown in Figs. 1, 9 and 10, with the result that the bosom is stretched over the ironing board. Upon the rotation of the rod 67 by means of the hand grip 68, the parts are locked in this position by the engagement of the friction shoe 69 with the periphery of the friction disk. To release the device the operator rotates the rod 67 to withdraw the shoe 69 and the parts are returned to normal position, the clamp being opened by the extreme forward movement of these parts.

Any adjustable type of neck band former may be utilized, but I have shown one form in Figs. 11 to 15 inclusive, which is adapted for use with the machine, and it will now be described.

Projecting upward from the neck band end of the ironing board 7 is a boss 70 having a rectangular recess 71 therein for the reception of a cleat 72 rigidly secured in any suitable manner to a neck band former base plate 73. This base plate is of a configuration corresponding to that of the neck band former when completely collapsed, and in the embodiment shown it is of the well known Manhattan shape. This base plate is provided at its center with a T-shaped guiding strip 74 which forms a guide for the forward curved portion of the neck band former as will appear. This base plate is further provided near its back corners with transversely extending cleats or guides 75 for the foot portions as will be described. Slidably mounted upon the base plate is the forward curved portion 76 of the neck band former and this portion corresponds in shape to the base plate except that at the rear corners it is cut out as at 77 for the reception of the foot portions as will appear. The forward curved portion 76 is provided on its under side with a T-shaped recess 78 for receiving the T-shaped guide 74 as shown in dotted line in Fig. 14, and the arrangement is such that the forward curved portion may slide back and forth freely upon this guide and upon the base plate. The forward curved portion 76 is provided at its upper surface with two diagonally disposed recesses 79 each of which receives a guide bar 80, on the end of which is a foot portion 81, adapted to nest in one of the recesses 77 of the forward curved portion when the neck band former is collapsed. Each of these foot portions is provided with a recess 82 for engagement with the corresponding cleat or guide 75. Each of the guide bars 80 is provided on its inner edge with teeth 83 forming a rack at this point and the two racks mesh with intermeshing gears 84 and 85, mounted in suitable recesses 86 and 87 upon pins 88 and 89 respectively, the pin 88 extending upward for a purpose to be described. Mounted in a suitable recess in the upper surface of the forward curved portion is a latch 90 supported upon a pin 91 and adapted to be engaged by a spring 92 which forces the end of the latch into engagement with a ratchet wheel secured to the gear 87. Arranged upon the top of the forward curved portion is a cover plate 93 having suitable openings therein for permitting the passage of the shaft 88 and the pin 91 and this plate holds the several parts of the neck band former in place. Secured to the upper end of the shaft 88 is a finger piece 94. Secured to the upper end of the pin 91 is a finger piece 95.

In using the press with this type of neck band former the operator starts with the parts of the former in collapsed position or that shown in Fig. 11; the shirt is then placed upon the board, with a button in the neck band, and the neck band former is enlarged by removing the latch 90 and manipulating the gears through the finger piece 94 until the neck band is completely stretched or extended; the latch is then released and the neck band former held in this position. The operator then straightens out the front of the shirt and fastens the skirt in the skirt stretcher at the forward end of the board. Then the ironing plate is brought down upon the bosom and moved until the curve of the plate engages the forward curved portion of the neck band former. The positioning of the plate, however, has brought about such an adjustment of the roller 35, through the mechanism already described, that when the chest is lowered, the edge of the chest at the neck band former recess will just miss the forward curved portion of the neck band former and engage the plate close to this forward curved portion.

Having described my invention, I claim:—

1. In an ironing press, an ironing board adapted to receive a shirt bosom and neck band, a relatively movable ironing chest having a neck band recess, means for automatically adjusting the chest to bring its neck band recess in proper position with respect to the neck band when the press is closed, and means for closing the press.

2. In an ironing press, an ironing board, means upon the board for holding the neck band upright upon the board, a relatively movable ironing chest having a recess for the neck band, means for closing the press, and means for automatically adjusting the ironing chest to bring its neck band recess in proper position to receive the neck band.

3. In an ironing press, an ironing board, a relatively movable ironing chest having a neck band former recess, a neck band former carried by the ironing board, and means for automatically adjusting the ironing chest with its neck band former recess in proper position with respect to the neck band former upon the ironing board.

4. In an ironing press, an ironing board, a neck band former mounted thereon, an ironing chest movable with respect to the ironing board, means for adjusting the neck band former to various sizes of neck bands, and means for automatically adjusting the ironing chest to the neck band former and upon the ironing board.

5. In an ironing press, an ironing board, a neck band former mounted thereon and comprising a stationary part and a forward portion movable for adjustment to various sizes of neck bands, a coöperating member for ironing upon said board adjacent to the neck band former, and means coöperating with the neck band former for adjusting said member with respect to the neck band former.

6. In an ironing press, a stationary ironing board, a neck band former mounted thereon, means for adjusting the neck band former to various sizes of neck bands, a movable ironing chest having a recess therein for receiving the neck band former, and means for automatically adjusting the position of the ironing chest so that the edge of the recess will engage close to the edge of the neck band operated upon.

7. In an ironing press, a stationary ironing board, a neck band former mounted thereon, means for adjusting the neck band former to various sizes of neck bands, an ironing chest movable with respect to the ironing board, an ironing plate adapted to receive the neck band former, and means operated by the ironing plate for adjusting the ironing chest to the various adjustments of the neck band former.

8. In an ironing press, a stationary ironing board, a neck band former mounted thereon, means for adjusting the neck band former, an ironing chest having a neck band former recess, an ironing plate, suitable mechanism between the ironing plate and the ironing chest whereby upon the adjustment of the ironing plate to the neck band former, the ironing chest will assume the proper position upon the ironing board with respect to the neck band former.

9. In an ironing press, an ironing board, a neck band former mounted thereon comprising a stationary part and a forward portion adjustable to various sizes of neck bands, an ironing plate having a portion for receiving the movable portion of the neck band former, and mechanism under the control of the ironing plate adapted to engage the ironing chest and adjust the same with respect to the neck band former.

10. In an ironing press, an ironing board, a neck band former mounted thereon, means for adjusting the neck band former, an ironing chest support movably mounted, an ironing chest movable on said support, and means for automatically adjusting the ironing chest with respect to the neck band former.

11. In an ironing press, an ironing board, a neck band former mounted thereon, means for adjusting the neck band former, an ironing chest support movably mounted, an ironing chest movable on said support, an ironing plate, and means operated by the ironing plate for adjusting the ironing chest with respect to the neck band former.

12. In an ironing press, an ironing board, an adjustable neckband former mounted thereon, an ironing chest support movable relative to said board, a chest movable on said support and provided with a neckband recess, an adjustable member mounted for engagement with a portion of the ironing chest during relative movement of the chest support and ironing board, and means coöperating with an adjustable portion of the neckband former for locating said adjustable member to thereby produce proper ironing relation between the neckband former and recess when the press is closed.

13. In an ironing press, an ironing board, a neckband former mounted thereon, means for adjusting the neckband former, an ironing chest support movably mounted, an ironing chest movable on said support, a cam carried by the ironing chest, a slidable member for engagement with said cam, and means coöperating with an adjustable portion of the neckband former for locating the slidable member to engage the cam and thereby adjust the ironing chest to the neckband former.

14. In a machine of the character described, the combination with a board for supporting an article to be operated upon by the machine, of an adjustable form projecting from the surface of said board, a member adapted to press the article supported on the surface of said board and having a recess therein to receive said form, mechanism for relatively moving said board and member into coöperative pressing relation with the form registering with the recess in said member, means for adjusting said form, and means coöperating with an adjustable portion of said form to control the relative positions of said board and member in their final pressing relation.

15. In a machine of the character described, the combination with a board for supporting an article to be operated upon by the machine, of an adjustable form projecting from the surface of said board, a member adapted to press the article supported on the surface of said board and having a recess therein to receive said form, mechanism for relatively moving said board and member into coöperative pressing relation with the form registering with the recess in said member, means for adjusting said form, and means coöperating with an adjustable portion of said form to determine the position of a portion of said mechanism to thereby maintain proper registration of the form and recess in any adjusted position of the form.

16. In an ironing press, an ironing board, a neckband former thereon, means for adjusting the neckband former to various sizes of neckbands, an ironing chest having a neckband recess, means coöperating with the adjustable portion of the neckband former to effect proper ironing relation of the chest and neckband former, and means for producing relative movement of the ironing chest and board.

17. In an ironing press, an ironing board, a neckband former thereon having a movable portion and a fixed portion, a movable ironing chest having a neckband recess, means coöperating with the movable portion of the neckband former to effect adjustment of the chest to properly position the neckband recess with respect to the neckband former, and means for producing relative movement of the ironing board and chest.

18. In an ironing press, an ironing board, a neckband former thereon having a movable portion and a fixed portion, a movable ironing chest having a neckband former recess, suitable mechanism arranged between the movable portion of the neckband former and the chest for bringing about the adjustment of the recess in the chest to the neckband former on the ironing board, and means for bringing about a relative movement of the ironing board and ironing chest.

19. In an ironing press, an ironing board, a neckband former thereon having a movable portion and a fixed portion, a movable ironing chest having a neckband former recess, suitable mechanism controlled by the movable portion of the neckband former and coöperating with the chest for bringing about the adjustment of the recess in the chest to the neckband former on the ironing board, and means for bringing about a relative movement of the ironing board and ironing chest.

20. In a machine of the character described, the combination with a board for supporting an article to be operated upon by the machine, of a form projecting from the surface of said board and having an adjustable forward portion, a member adapted to press the article supported on the surface of said board and having a recess therein to receive said form, mechanism for relatively moving said board and member into coöperating pressing relation with the forward portion of the form registering with the recess in said member, means for adjusting said form, and means whereby the adjustment of the forward portion of said form controls the relative positions of said board and member in their final pressing relation.

In testimony whereof I affix my signature in presence of two witnesses as follows:

LADBROOK H. FREEMAN.

Witnesses:
   G. O. FARQUHARSON,
   C. H. TRESCH.